UNITED STATES PATENT OFFICE.

RICHARD K. GREGORY, OF GREENSBOROUGH, NORTH CAROLINA.

ADHESIVE PLASTER.

SPECIFICATION forming part of Letters Patent No. 443,963, dated December 30, 1890.

Application filed August 6, 1890. Serial No. 361,195. (No specimens.)

*To all whom it may concern:*

Be it known that I, RICHARD K. GREGORY, residing at Greensborough, in the county of Guilford and State of North Carolina, have invented a new and useful Improvement in Adhesive Plasters for the Treatment of Wounds, &c., of which the following is a specification.

This invention relates to adhesive plasters; and it consists in a fabric of cotton, linen, or other porous or absorbent material saturated with a compound consisting of gum-turpentine, about six pounds; alcohol, about one gallon; tannic acid, about four ounces; cane-sugar, about one pound; gum-camphor, about four ounces; bichloride of mercury, about one-half dram; carbolic acid, about eight ounces; muriate of cocaine, about two drams.

The fabric, which may be of any suitable size or shape, is dipped in or coated with the compound and may be used as soon as prepared or any time thereafter.

The plaster is placed over the wound, the cut parts being carefully drawn together. The heat of the body is sufficient to cause the plaster to adhere firmly to the part.

This plaster, besides having superior adhesive properties, possesses, of course, the hemastatic, styptic, antiseptic, and anæsthetic properties of the compound, and is of great value in the treatment of wounds.

One side of the fabric of which the plaster is formed may, if desired, be coated with rubber or other water-proof material.

The ingredients of the plaster being insoluble in water, cold-water dressings may be applied, when necessary, over the plaster or bandage.

I do not claim, broadly, in this application the compound herein described, such compound being the subject-matter of a separate application filed with even date; but What I do claim, and desire to secure by Letters Patent, is—

1. An adhesive plaster consisting of a fabric coated or impregnated with gum-turpentine, alcohol, tannic acid, cane-sugar, gum-camphor, bichloride of mercury, carbolic acid, and muriate of cocaine.

2. The herein-described medical compound, consisting of gum-turpentine, alcohol, tannic acid, cane-sugar, gum-camphor, bichloride of mercury, carbolic acid, and muriate of cocaine, in about the proportions specified.

RICHARD K. GREGORY.

Witnesses:
SOLON C. KEMON,
CHAS. A. PETTIT.